(12) United States Patent
Alday et al.

(10) Patent No.: US 10,202,989 B2
(45) Date of Patent: Feb. 12, 2019

(54) ROTARY HYDRAULIC ACTUATOR SEAL

(71) Applicant: Trelleborg Sealing Solutions US, Inc., Fort Wayne, IN (US)

(72) Inventors: Jennifer E. Alday, Gibsonville, NC (US); Larry J. Castleman, Monroeville, IN (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 0 days.

(21) Appl. No.: 14/851,845

(22) Filed: Sep. 11, 2015

(65) Prior Publication Data

US 2016/0076651 A1 Mar. 17, 2016

Related U.S. Application Data

(60) Provisional application No. 62/049,439, filed on Sep. 12, 2014.

(51) Int. Cl.
| | |
|---|---|
| *F16J 15/32* | (2016.01) |
| *F15B 21/00* | (2006.01) |
| *F16J 15/3232* | (2016.01) |
| *F16J 15/3284* | (2016.01) |
| *F16J 15/3208* | (2016.01) |

(52) U.S. Cl.
CPC ......... *F15B 21/006* (2013.01); *F16J 15/3208* (2013.01); *F16J 15/3232* (2013.01); *F16J 15/3284* (2013.01)

(58) Field of Classification Search
CPC ...... F16J 15/32; F16J 15/3244; F16J 15/3248; F16J 15/3276; F15B 21/006
See application file for complete search history.

(56) References Cited

U.S. PATENT DOCUMENTS

| | | | | | |
|---|---|---|---|---|---|
| 2,968,501 | A | * | 1/1961 | Tisch | F16J 15/32 277/448 |
| 3,268,235 | A | * | 8/1966 | Jacobellis | F16J 15/32 277/468 |
| 3,328,041 | A | * | 6/1967 | Bloom | F16J 15/32 277/468 |
| 3,418,001 | A | * | 12/1968 | Rentschler | F16J 15/32 277/468 |
| 3,427,051 | A | * | 2/1969 | White | F16L 27/026 277/398 |

(Continued)

FOREIGN PATENT DOCUMENTS

| | | |
|---|---|---|
| CN | 202125616 U | 1/2012 |
| JP | 2012-92976 A | 5/2012 |

OTHER PUBLICATIONS

Notification of Transmittal of the International Search Report and the Written Opinion of the International Searching Authority, or the Declaration dated Dec. 10, 2015 for International Application No. PCT/US2015/049715 (14 pages).

(Continued)

*Primary Examiner* — Gilbert Y Lee
(74) *Attorney, Agent, or Firm* — Taylor IP, P.C.

(57) ABSTRACT

A sealing assembly includes an elastomer seal having an inner surface and a polymer cap bonded to the inner surface of the elastomer seal and having a dynamic sealing surface. The polymer cap is configured to form a continuous fluid-tight seal against a curved element when pressurized.

19 Claims, 5 Drawing Sheets

(56) References Cited

U.S. PATENT DOCUMENTS

| | | | |
|---|---|---|---|
| RE28,105 E * | 8/1974 | Traub | F16J 15/32 277/582 |
| 3,869,963 A | 3/1975 | Schindel | |
| 4,101,140 A | 7/1978 | Reid | |
| 4,289,321 A | 9/1981 | Cather, Jr. | |
| 4,501,431 A | 2/1985 | Peisker et al. | |
| 4,650,196 A | 3/1987 | Bucher et al. | |
| 4,702,482 A | 10/1987 | Oseman | |
| 4,889,351 A * | 12/1989 | Frost | F16J 15/32 277/460 |
| 4,917,390 A * | 4/1990 | Lee | F16J 15/3208 277/468 |
| 5,066,027 A * | 11/1991 | Edlund | F16J 15/32 277/552 |
| 5,092,610 A * | 3/1992 | Dunham | F16J 15/3212 277/589 |
| 5,172,921 A * | 12/1992 | Stenlund | F16J 15/32 277/300 |
| 5,380,016 A * | 1/1995 | Reinsma | F16J 15/3208 277/503 |
| 6,029,979 A * | 2/2000 | Grosspietsch | F16J 15/3236 277/434 |
| 6,305,483 B1 | 10/2001 | Portwood | |
| 6,450,502 B1 * | 9/2002 | Baehl | F16J 15/164 277/387 |
| 6,536,542 B1 | 3/2003 | Fang et al. | |
| 7,341,258 B2 | 3/2008 | Holt et al. | |
| 7,461,708 B2 * | 12/2008 | Yong | E21B 10/25 175/359 |
| 8,702,106 B2 * | 4/2014 | Berckenhoff | E21B 33/061 277/589 |
| 9,169,377 B2 * | 10/2015 | Nanayakkara | C08L 21/00 |
| 9,261,139 B2 * | 2/2016 | McCulfor | F16J 15/16 |
| 2005/0035556 A1 | 2/2005 | Lang et al. | |
| 2006/0065445 A1 * | 3/2006 | Chellappa | E21B 10/25 175/372 |
| 2008/0157486 A1 | 7/2008 | Kuzawa et al. | |

OTHER PUBLICATIONS

Extended European Search Report dated Apr. 26, 2018 for European Patent Application No. 15 84 0876 (8 pages).

* cited by examiner

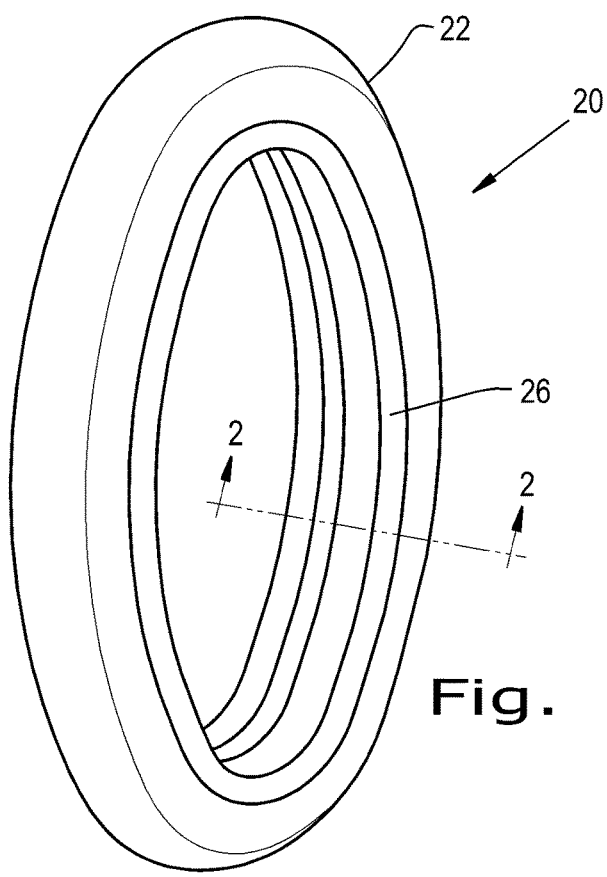
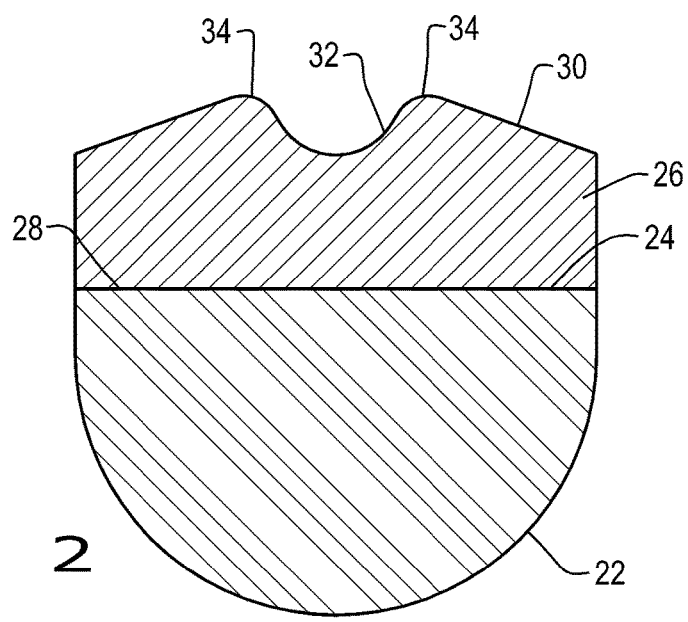

ROTARY HYDRAULIC ACTUATOR SEAL

CROSS REFERENCE TO RELATED APPLICATIONS

This is a non-provisional application based upon U.S. provisional patent application Ser. No. 62/049,439, entitled "ROTARY HYDRAULIC ACTUATOR SEAL", filed Sep. 12, 2014, which is incorporated herein by reference.

BACKGROUND OF THE INVENTION

1. Field of the Invention

The present invention relates to seals, and, more particularly, to dynamic seals.

2. Description of the Related Art

A seal is a structure included in devices to prevent media from flowing past the seal into other areas of the device. Seals come in a great variety of shapes and sizes, depending on their intended application(s). One type of seal is a rotary seal, which is used in rotary applications. Such seals are disposed around a rotating element, such as a shaft, and create a seal around the rotating element. Another type of seal is a linear seal, which is used in linear applications. Such seals are disposed around a reciprocating element, such as a shaft, and create a seal around the reciprocating element.

When designing rotary and linear seals, durability of the seal is an importance design consideration due to the need for consistent performance of the seal throughout the lifetime of the seal. If the shape of the seal is altered due to damage from frictional heat or abrasion, a leak path may be formed that will allow the undesirable flow of media past the seal. Such damage typically requires the seal to be replaced, which can be an expensive and time-consuming endeavor if the seal is located in an environment that requires a significant amount of disassembly to access.

Another cause of seal damage and failure that negatively impacts seal performance can be caused by extrusion of the seal material during operation. As is known, sealing environments typically have a clearance formed between the sealed element and the hardware adjacent to the location of the seal, which can be placed in a groove formed in the hardware, that is referred to as an extrusion gap. During operation of the hardware, differential pressures can cause the seal to be forced against the groove of the hardware and deform the material of the seal. If sufficiently forced, the seal material can be overly deformed into the extrusion gap and damaged due to abrasion. Once the differential pressure is removed, the seal returns to its original shape minus any seal material that abraded away due to extrusion, which can lead to loss of compression of the seal and a leak path being formed. Further, damage that arises due to extrusion can compound throughout the life of the seal to progressively abrade away larger portions of the seal material. Attempts to reduce the damage caused by extrusion have included using sealing materials with higher hardness modulus and/or wider dynamic sealing lips, which reduces the design flexibility of seals and can result in significant friction at the dynamic sealing interface that hampers the function of the sealing element and can create excessive heat that will damage the seal.

Another consideration that plays an important part in the design of dynamic seals is the shape of the hardware and moving element that are to be sealed. Particularly, sealing elements that are curved or non-round can present a challenge due to an asymmetrical or irregular shape that is difficult to properly seal and prevent leakage. Specifically, these shapes do not have a constant clearance, relative to the hardware, across the length of the shape. The non-constant clearance makes it difficult to form a continuous seal around the entirety of the element, especially if the element moves.

What is needed in the art is a seal that can be used to continuously seal curved or non-round elements.

SUMMARY OF THE INVENTION

The present invention provides an elastomer seal with a polymer cap bonded to the inner surface of the elastomer seal that acts as a self-sealing element and is readily adaptable to seal a variety of shapes.

The invention in one form is directed to a sealing assembly including an elastomer seal having an inner surface and a polymer cap bonded to the inner surface of the elastomer seal and having a dynamic sealing surface, the polymer cap being configured to form a continuous fluid-tight seal against a curved element when pressurized.

The invention in another form is directed to an actuator including: a housing having a chamber formed therein and a seal space in fluid communication with the chamber formed therein; a dynamic element placed in the chamber that defines a longitudinal axis and is curved in a direction of the longitudinal axis; and a sealing assembly placed in the seal space to form a fluid-tight seal between the dynamic element and the housing. The sealing assembly includes: an elastomer seal having an outer surface in contact with a wall of the seal space and an inner surface; and a polymer cap bonded to the inner surface of the elastomer seal that is configured to extrude under pressure to form the fluid-tight seal between the curved surface of the dynamic element and the housing.

An advantage of the present invention is the polymer cap can act as a self-sealing element that extrudes toward the curved surface to form a fluid-tight seal.

Another advantage is the elastomer seal acts as an energizer for the polymer cap.

Yet another advantage is bonding the polymer cap to the elastomer seal allows tighter tolerance for the part.

Yet another advantage is the sealing assembly can resist fluid penetration at low and high temperatures over a range of pressures.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a perspective view of an embodiment of a sealing assembly formed according to the present invention;

FIG. 2 is a cross-sectional view of the sealing assembly shown in FIG. 1 taken along line 2-2;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 3:
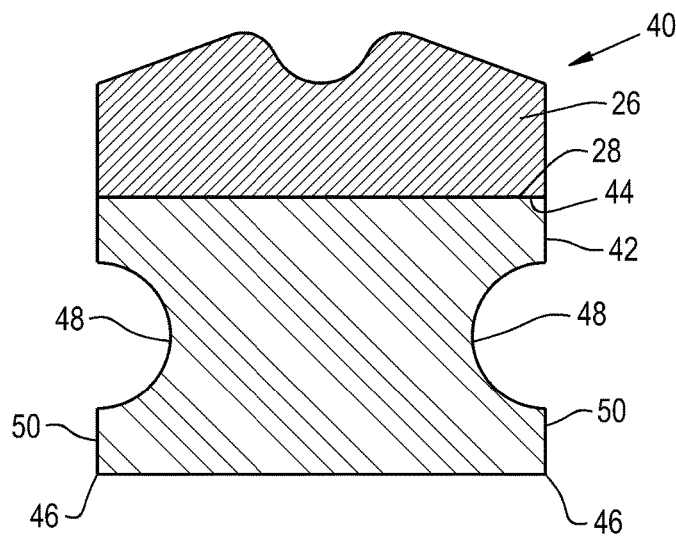
FIG. 3 is a cross-sectional view of another embodiment of a sealing assembly formed according to the present invention.

Referring now to the drawings, and more particularly to FIGS. 1-2, there is shown a sealing assembly 20 which generally includes an elastomer seal 22 with an inner surface 24 (shown in FIG. 2) and a polymer cap 26 bonded to the inner surface 24 of the elastomer seal 22. The elastomer seal 22 and polymer cap 26, as shown, can have a generally oval shape with the cap 26 bonded to the inner surface 24 of the elastomer seal 22, which corresponds to an inner diameter of the oval. As used herein, "oval" shaped corresponds to a shape that is defined generally as two or more radii about a center of the shape, resulting in a shape that resembles an elongated or squished circle. The sealing assembly 20 is appropriate to be used in a rotary hydraulic actuator that requires no leakage to the outside, either residing within an oval groove in a bore of the actuator or directly bonded to the actuator. The sealing assembly 20 can form a continuous fluid-tight seal around a curved or non-round element since it runs all around the curved element forming a continuous shape and can resist fluid penetration at low and high temperatures over a range of pressures. The sealing assembly 20 can also seal in both static and dynamic conditions with minimal leakage.

Referring specifically now to FIG. 2, it can be seen that the elastomer seal 22 can have a semi-circular cross-section with a flat inner surface 24 that is bonded to a flat bonding surface 28 of the polymer cap 26. The round cross-section of the elastomer seal 22 can face pressure that arises in the sealing environment to compress the elastomer seal 22 and provide an energizing force to the polymer cap 26 that will keep the polymer cap 26 in loaded contact with the rotating element. In this sense, the elastomer seal 22 acts as an energizer for the polymer cap 26. The elastomer seal 22 can be formed of any suitable material that allows the elastomer seal 22 to seal in the radial direction and energize the polymer cap 26, such as rubber or soft polymer compounds.

The polymer cap 26 has a dynamic sealing surface 30 opposite to the flat bonding surface 28 that will seal against a rotating element such as a shaft. As can be seen, the sealing surface 30 can have a channel 32 formed in the middle of the sealing surface 30 between a pair of rounded peaks 34. The polymer cap 26 can be formed of any suitable polymer material, with one exemplary polymer material being a polytetrafluoroethylene (PTFE) material, due to their generally good friction, wear, and extrusion properties, which will be described further herein.

To bond the two surfaces 24 and 28 together, one or both of the surfaces 24 and 28 can be partially melted before pressing the two surfaces 24 and 28 together to form a thermal bond between the elastomer seal 22 and the polymer cap 26. Alternatively, an adhesive material such as an epoxy or cyanoacrylate compound can be used to bond the polymer cap 26 to the elastomer seal 22. It should be appreciated that the bonding methods described herein are exemplary only and that the polymer cap 26 can be bonded to the inner surface 24 in any suitable manner. The bond between the bonding surface 28 and the inner surface 24 can be formed so that the majority of each surface 28 and 24 is bonded to the other surface. As can be seen in, for example, FIG. 2, the substantial entirety of the bonding surface 28 can be bonded to the inner surface 24 to form a strong bond between the polymer cap 26 and the elastomer seal 22. By bonding the polymer cap 26 to the elastomer seal 22, the two pieces are prevented from moving relative to one another during installation of the sealing assembly 20 or oscillation of the sealing assembly 20 that will occur as differential pressure is produced in the sealing environment. Bonding the polymer cap 26 to the elastomer seal 22 also allows for tighter tolerances and better load distribution across the sealing assembly 20 to improve the balance of leakage, friction, and wear.

Referring now to FIG. 3, another embodiment of a sealing assembly 40 is shown that includes an elastomer seal 42 bonded to the polymer cap 26 shown in FIGS. 1-2. As can be seen, the bonding surface 28 of the polymer cap 26 is bonded to a flat surface 44 of the elastomer seal 42, which has a substantially rectangular cross-section. Unlike the elastomer seal 22 shown in FIGS. 1-2, the elastomer seal 42 has squared corners 46 and grooves 48 formed in axial sides 50 of the elastomer seal 42 that will allow for pressure to press against the walls of the grooves 48 to compress the elastomer seal 42 and energize the polymer cap 26. Alternatively, the grooves 48 formed in the elastomer seal 42 can accommodate protrusions formed in a housing where the sealing assembly 40 is placed in order to keep the sealing assembly 40 tightly held within the housing. In such an instance, the protrusions of the housing can be oversized, relative to the grooves 48, to compress the elastomer seal 42 and energize the polymer cap 26.

Figure 4:
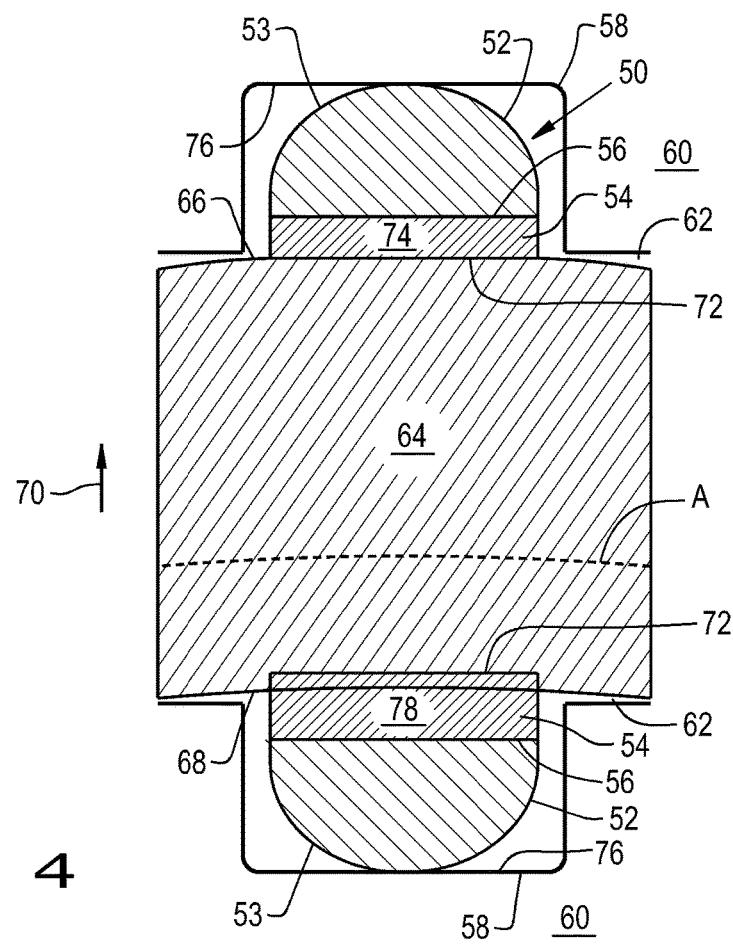
FIG. 4 is a cross-sectional view of yet another embodiment of a sealing assembly formed according to the present invention installed in a groove to seal about a moving element.

To illustrate operation of the present invention, and referring now to FIG. 4, yet another embodiment of a sealing assembly 50 according to the present invention is shown that includes an elastomer seal 52 and a polymer cap 54 bonded to an inner surface 56 of the elastomer seal 52. As can be seen, the sealing assembly 50 has been installed in a seal space 58, shown as a groove, formed inside a housing 60 of an actuator, with an outer surface 53 of the elastomer seal 52 contacting a wall of the groove 58. The housing 60 also has a chamber 62 formed therein where a dynamic element 64, shown as a shaft that is curved along a longitudinal axis A of the shaft 64, is placed. The chamber 62 is fluidly connected to the seal space 58 such that the sealing assembly 50 seals one axial side of the chamber 62 from the other. As can be seen, due to the nature of the curvature of the shaft 64, curved portions 66 and 68 are asymmetrical relative to the housing 60 such that curved portion 66 curves in a radial direction, designated by arrow 70, toward the groove 58 while the curved portion 68 curves in the radial direction 70 away from the groove 58. This also occurs due to pressure in the environment during operation pushing on the shaft 64 to offset the shaft 64 in the chamber 62. The asymmetry of the shaft 64 during operation causes a smaller clearance between the curved portion 66 of the shaft 64 and housing 60 to be formed, as illustrated, on the top side of the chamber 62 and a larger clearance between the curved portion 68 of the shaft 64 and housing 60 to be formed, as illustrated, on the bottom side of the chamber 62. To compensate for the asymmetrical nature of the clearances during operation, the polymer cap 54 is configured so that as pressure develops in the groove 58, the polymer cap 54 extrudes and forces a dynamic sealing surface 72 of the polymer cap 54 against the shaft 64 to form a continuous fluid-tight seal between the dynamic sealing surface 72 and the shaft 64. This is illustrated in FIG. 4, with a first portion 74 of the polymer cap 54, adjacent to the surface 66, being deformed by the surface 66 toward a radial wall 76 of the groove 58 while a second portion 78 of the polymer cap 54 opposite the first portion 74 and adjacent to the surface 68 is extruded by pressure in the groove 58 away from the radial wall 76 and toward the surface 68 of the shaft 64 to form a continuous fluid-tight seal along the length of the polymer cap 54. The extrusion of the polymer cap 54 toward the surface 68 of the shaft 64, therefore, allows the polymer cap 68 to be a self-sealing element that will automatically seal against the shaft 64 and form a continuous fluid-tight seal across the length of the sealing assembly 50. Since pressure is not always present, such as when the shaft 64 is not moving, the elastomer seal 52 acts as an energizer to provide the necessary loading to keep the dynamic sealing surface 72 of the polymer cap 54 pressed against the shaft 64. As extrusion allows the polymer cap 68 to be a self-sealing element, PTFE makes a good material to form the polymer cap 68 since PTFE has low friction and good wear and extrusion properties. However, it should be appreciated that polymer materials other than PTFE can be used to form the polymer cap 54 if the chosen material allows the polymer cap 54 to form a continuous fluid-tight seal against the shaft 64, or another curved element, when being extruded by pressure. It should be appreciated that when referring to a "curved element," the curvature defining whether an element is "curved" or not is in the longitudinal direction of the element, i.e., a cylinder defined about a straight longitudinal axis is not a "curved element" while a cylinder defined about an arced longitudinal axis is a "curved element."

Figure 5:
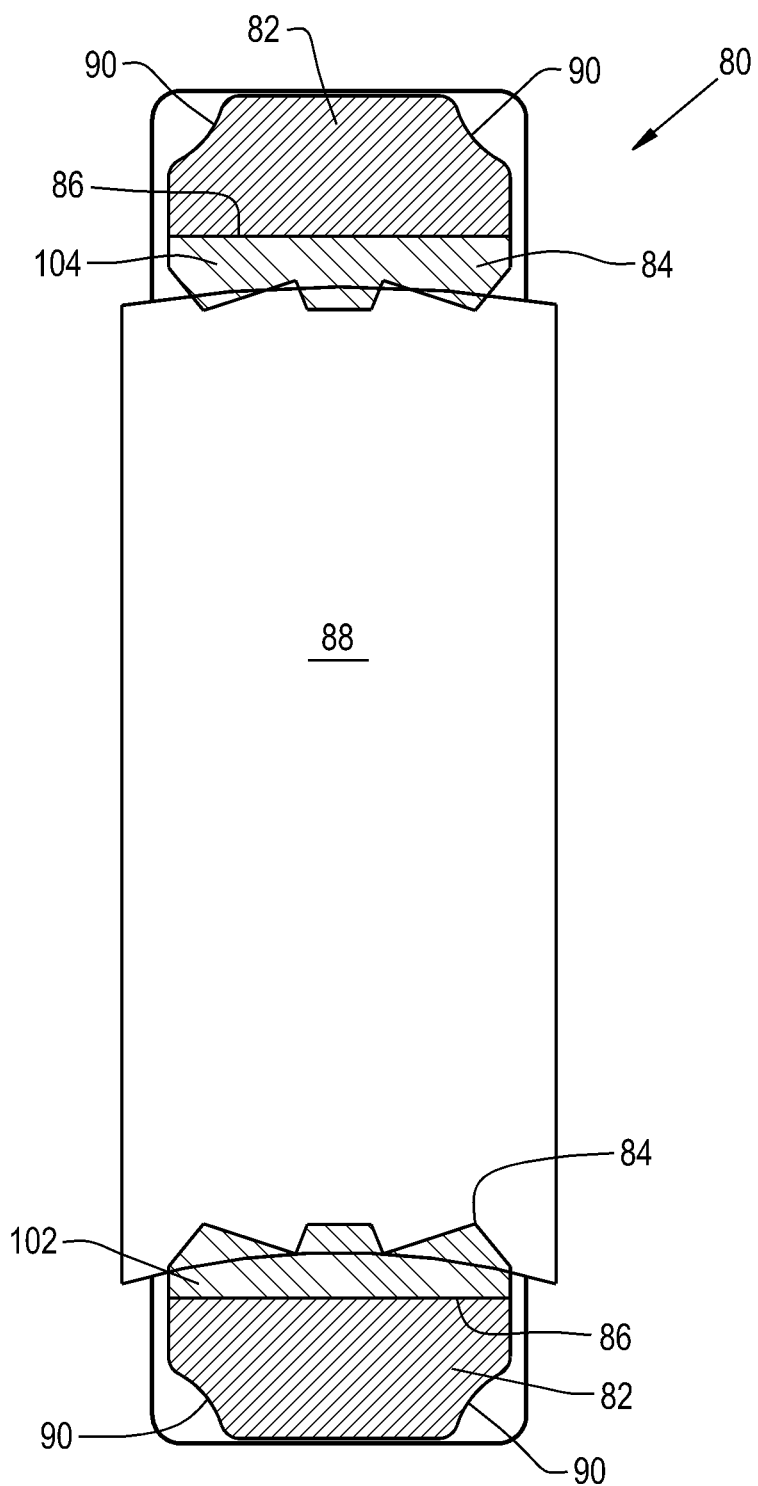
FIG. 5 is a cross-sectional view of yet another embodiment of a sealing assembly formed according to the present invention installed in a groove to seal about a moving element.
Figure 6:
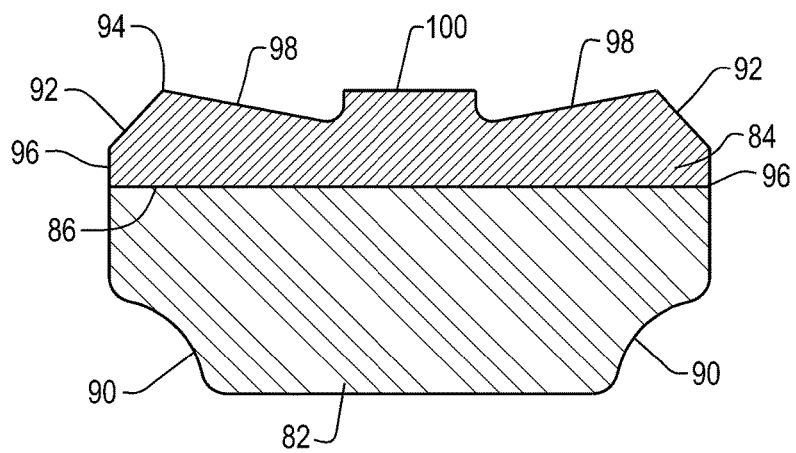
FIG. 6 is a cross-sectional view of a portion of the sealing assembly shown in FIG. 5.

Referring now to FIGS. 5 and 6, another embodiment of a sealing assembly 80 formed according to the present invention is shown that includes an elastomer seal 82 and a polymer cap 84 bonded to an inner surface 86 of the elastomer seal 82. As can be seen in FIG. 5, the polymer cap 84 can extrude when pressurized to form a continuous fluid-tight seal with a curved shaft 88. The elastomer seal 82 can be formed to have a substantially rectangular cross-section with rounded corners 90 that are concave, i.e., cut into the material of the elastomer seal 82 rather than bulging outward. The concave corners 90 will always face pressurized fluid in the sealing environment to increase the amount of pressure caused by the fluid that can be utilized to form a seal. The polymer cap 84 can be formed to have a pair of edges 92 in a dynamic sealing surface 94 of the polymer cap 84 that are angled relative to the inner surface 86 of the elastomer seal 82 and remove material adjacent to axial sides 96 of the polymer cap 84. At the end of the edges 92, another pair of edges 98 can be made into the dynamic sealing surface 94 that are angled relative to the inner surface 86 of the elastomer seal 82 in the opposite direction of the edges 92. These cooperating edges 92 and 98 can allow a pocket of lubricant to be formed between the dynamic sealing surface 94 and a dynamic element, to reduce friction at the dynamic sealing surface 94. A sealing lip 100 can be formed in the middle of the dynamic sealing surface 94 to seal against the dynamic element and have any shape suitable to seal against the dynamic element. During operation, the polymer cap 84 can extrude so that the sealing lip 100 expands away from the inner surface 86 of the elastomer seal 82 to come in contact with a curved surface of a curved dynamic element.

While the embodiments of the present invention shown in FIGS. 1-6 have been previously described as sealing around curved or non-round elements with an extruding polymer cap, a continuous fluid-tight seal around curved or non-round elements can also be formed according to the present invention by altering the cross-section of the polymer cap's dynamic sealing surface along a length of the polymer cap. For example, the polymer cap 84 of the sealing assembly 80 shown in FIG. 5 can be manufactured so that the polymer cap 84 has a first portion 102, shown on the bottom of FIG. 5, with a cross-sectional shape that is different than a second portion 104 of the polymer cap 84, which is shown on the top of FIG. 5. As shown, the first portion 102 of the polymer cap 84 has a greater thickness than the second portion 104 of the polymer cap 84, allowing the first portion 102 to form a fluid-tight seal with the curved shaft 88 at a portion of the curved shaft 88 with a larger clearance from its housing and the second portion 104 to form a fluid-tight seal with the curved shaft 88 at a portion of the curved shaft 88 with a smaller clearance from its housing. By giving the polymer cap 84 a varying cross-section along a length of the polymer cap 84, a continuous fluid-tight seal can be formed with the curved shaft 88. While the thickness of the first portion 102 and the second portion 104 are shown as being varied, the cross-section of the portions 102 and 104 can also have different geometries that differ in shape rather than just dimension. It should be appreciated that the varying cross-sections of the polymer cap 84 along its length, which correlate with the geometry of the cap 84, can also be combined with the extrusion properties of the polymer cap 84, which correlate with the material properties of the polymer forming the cap 84, to form a polymer cap that has both varying cross-sections along a length of the polymer cap and will extrude when pressurized to form a continuous fluid-tight seal against a curved element.

Figure 7:
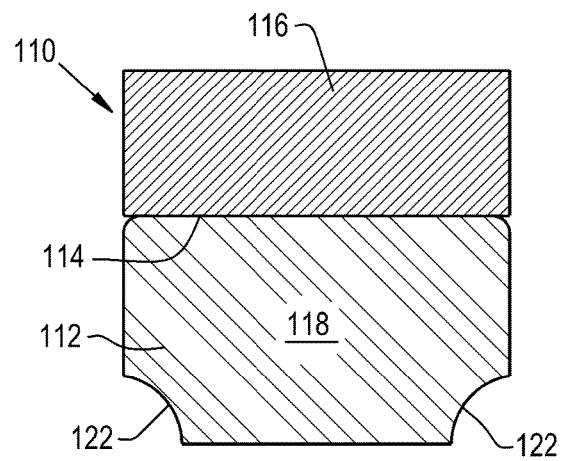
FIG. 7 is a cross-sectional view of a portion of yet another embodiment of a sealing assembly formed according to the present invention.
Figure 8:
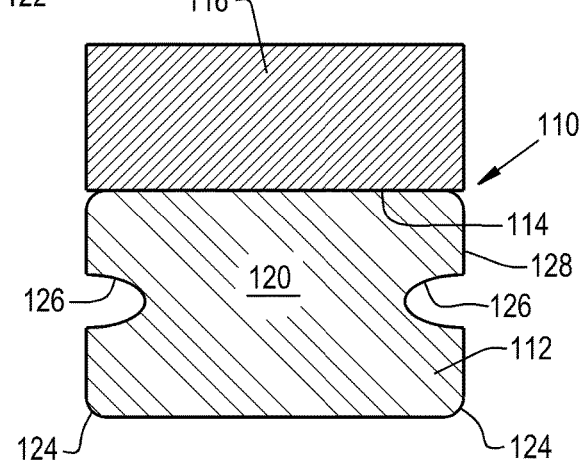
FIG. 8 is a cross-sectional view of another portion of the sealing assembly shown in FIG. 7.

Referring now to FIGS. 7-8, cross-sections of another embodiment of a sealing assembly 110 formed according to the present invention are shown, the sealing assembly 110 including an elastomer seal 112 with an inner surface 114 and a polymer cap 116 bonded to the inner surface 114. As can be seen in FIGS. 7 and 8, the polymer cap 116 has a constant cross-section throughout the length of the sealing assembly 110, while the elastomer seal 112 has a first portion 118, shown in FIG. 7, and a second portion 120, shown in FIG. 8, that differ from one another. The first portion 118 of the elastomer seal 112, for example, can have rounded corners 122 that are concave while the second portion 120 of the elastomer seal 112 can have significantly less rounded corners 124 and a pair of grooves 126 formed in axial sides 128 of the second portion 120. In this sense, the outer surface of the first portion 118 has a different shape than the outer surface of the second portion 120. By varying the shape of the first portion 118 and second portion 120, the nature of the pressure applied to the polymer cap 116 by the elastomer seal 112 can differ to alter the amount of extrusion of the polymer cap 116 that occurs, depending on what part of the length of the elastomer seal 112 is bonded to the polymer cap 116. It should be appreciated that the elastomer seal 112 does not need to have varying cross-sections along an entirety of its length, although this is a possible configuration, but may have only two halves, such as portions 118 and 120, that form the elastomer 112 and have different cross-sections relative to one another.

Figure 9:
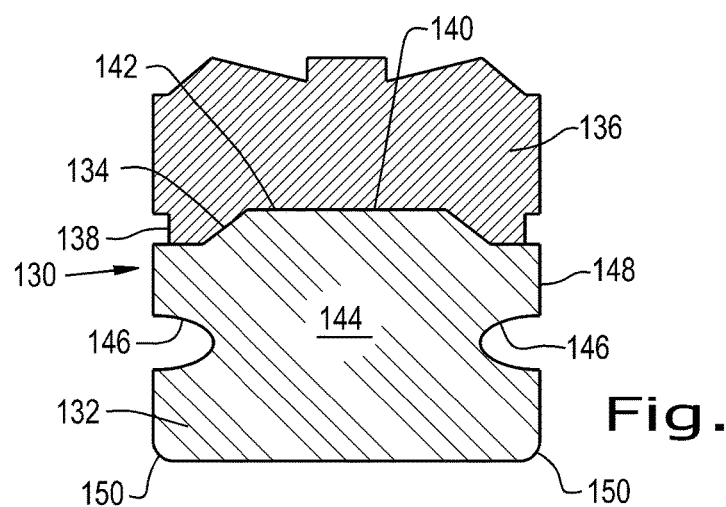
FIG. 9 is a cross-sectional view of a portion of yet another embodiment of a sealing assembly formed according to the present invention.
Figure 10:
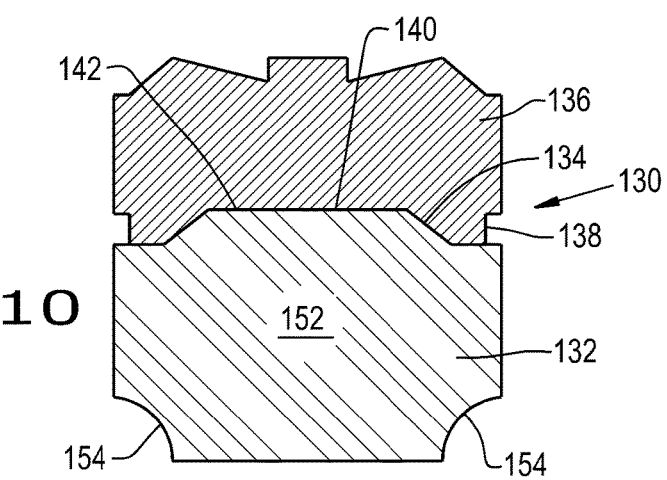
FIG. 10 is a cross-sectional view of another portion of the sealing assembly shown in FIG. 9.

Referring now to FIGS. 9-10, cross-sections of yet another embodiment of a sealing assembly 130 according to the present invention is shown with an elastomer seal 132 having an inner surface 134 and a polymer cap 136 bonded to the inner surface 134. Similar to the sealing assembly 110 shown in FIGS. 7-8, the sealing assembly 130 shown in FIGS. 9-10 has a polymer cap 136 that has a constant cross-section along its length. The cross-sectional shape of the polymer cap 136 is similar to that of the polymer cap 84 shown in FIGS. 5-6, with an additional pair of grooves 138 being formed in the polymer cap 136 adjacent to where the polymer cap 136 bonds to the inner surface 134 of the elastomer seal 132. Unlike the inner surfaces previously shown, the inner surface 134 of the elastomer seal 132 has a raised portion 140 that bonds with a bonding groove 142 formed in the polymer cap 136, which can alter the distribution of applied pressure from the elastomer seal 132 to the polymer cap 136. Similar to the elastomer seal 112 shown in FIGS. 7-8, the elastomer seal 132 has a first portion 144 (shown in FIG. 9) with a pair of grooves 146 formed in axial sides 148 of the first portion 144 as well slightly rounded corners 150, and a second portion 152 (shown in FIG. 10) with concave rounded corners 154.

It should be appreciated that the cross-sections of both the polymer cap and elastomer seal of the present invention can vary along the length of the formed sealing assembly, and that varying one across a length of the sealing assembly does not preclude varying the other across the length of the sealing assembly. For example, a sealing assembly can be formed with a polymer cap and elastomer seal both having a first portion with the cross-sectional shapes of the polymer cap and elastomer seal shown in FIG. 7 and a second portion with the cross-sectional shapes of the polymer cap and elastomer seal shown in FIG. 10. Such a sealing assembly would therefore have both an elastomer seal and polymer cap with cross-sections that vary across a length of the sealing assembly. It is also contemplated that rather than varying the cross-sections of the elastomer seal and/or polymer cap, the geometry of the seal space where the sealing assembly is placed can be varied across the length of the seal space to achieve a similar effect to varying the cross-sections of the elastomer seal and/or polymer cap.

Figure 11:
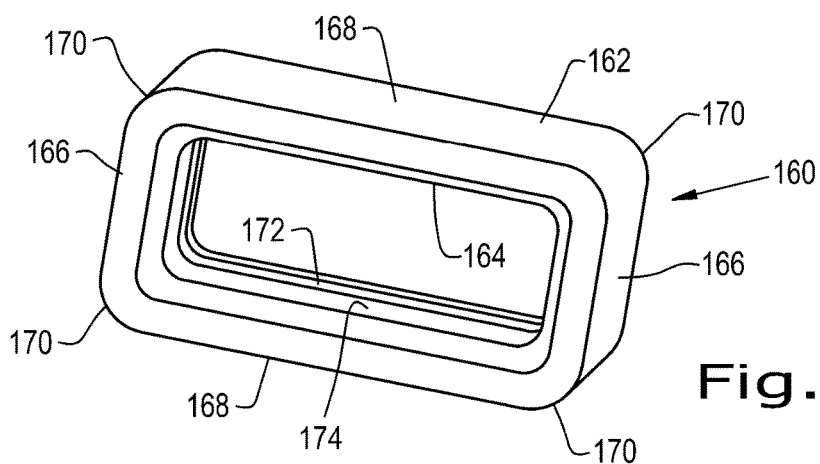
FIG. 11 is a perspective view of yet another embodiment of a sealing assembly formed according to the present invention.

Referring now to FIG. 11, yet another embodiment of a sealing assembly 160 according to the present invention is shown that includes an elastomer seal 162 with a polymer cap 164 bonded to an inner surface (not shown) of the elastomer seal. As can be seen, the elastomer seal 162 and polymer cap 164 both have a substantially rectangular shape with a first pair of straight sides 166 of equal length connected to a second pair of straight sides 168 of equal length. To better accommodate a curved element, the elastomer seal 162 and/or polymer cap 164 can have a rounded corner 170 where each side 166, 168 meets another side 168, 166. The polymer cap 164 can also have a channel 172 formed on a dynamic sealing surface 174 of the polymer cap 164, similar to previously shown and described polymer caps. It should thus be appreciated that the sealing assemblies can be formed in a variety of shapes and sizes to form a continuously fluid-tight seal around curved and non-round dynamic elements.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sealing assembly, comprising:
a curved element defining an arced longitudinal axis and having a curvature in a longitudinal direction and two asymmetric portions in the form of a first asymmetric portion and a second asymmetric portion opposite the first asymmetric portion;
an elastomer seal having an inner surface; and
a polymer cap bonded to said inner surface of said elastomer seal and having a dynamic sealing surface, a first cap portion adjacent to the first asymmetric portion, and a second cap portion opposite the first cap portion and adjacent to the second asymmetric portion, said polymer cap being configured to asymmetrically extrude so as to form a continuous fluid-tight seal against said two asymmetric portions of the curved element with the first cap portion being deformed by the first asymmetric portion and the second cap portion being extruded toward the second asymmetric portion when said polymer cap is pressurized.

2. The sealing assembly according to claim 1, wherein at least one of said elastomer seal and said polymer cap defines a substantially oval shape.

3. The sealing assembly according to claim 1, wherein said elastomer seal includes a first seal portion connected to a second seal portion, said first seal portion defining a first seal cross-sectional shape and said second seal portion defining a second seal cross-sectional shape that is different than said first seal cross-sectional shape.

4. The sealing assembly according to claim 3, wherein said first seal portion includes a first seal outer surface and said second seal portion includes a second seal outer surface, said first seal outer surface being continuous with said second seal outer surface, said first seal outer surface having a different shape than said second seal outer surface.

5. The sealing assembly according to claim 3, wherein at least one of said first seal portion and said second seal portion has a groove formed therein.

6. The sealing assembly according to claim 3, wherein at least one of said first seal portion and said second seal portion includes at least one rounded corner.

7. The sealing assembly according to claim 6, wherein said at least one rounded corner is concave.

8. The sealing assembly according to claim 1, wherein said first cap portion defining a first cap cross-sectional shape and said second cap portion defining a second cap cross-sectional shape that is different than said first cap cross-sectional shape.

9. The sealing assembly according to claim 8, wherein said first cap portion has a first cap thickness and said second cap portion has a second cap thickness that is different than said first cap thickness.

10. The sealing assembly according to claim 1, wherein at least one of said elastomer seal and said polymer cap defines a substantially rectangular shape.

11. The sealing assembly according to claim 10, wherein said elastomer seal having at least one rounded corner and said dynamic sealing surface of said polymer cap includes at least one channel formed therein.

12. The sealing assembly according to claim 1, wherein said polymer cap is bonded to at least 80% of said inner surface of said elastomer seal.

13. The sealing assembly according to claim 12, wherein said polymer cap is bonded to and substantially covers all of said inner surface of said elastomer seal.

14. An actuator, comprising:
a housing having a chamber formed therein and a seal space in fluid communication with said chamber formed therein, the seal space having a radial wall;
a dynamic element placed in said chamber, said dynamic element defining an arced longitudinal axis and being curved in a direction of said arced longitudinal axis, said dynamic element having two asymmetric portions in the form of a first asymmetric portion and a second asymmetric portion opposite the first asymmetric portion; and
a sealing assembly placed in said seal space to form a continuous fluid-tight seal against said two asymmetric portions of said dynamic element, said sealing assembly including:
an elastomer seal having an outer surface in contact with the radial wall of said seal space and an inner surface; and
a polymer cap bonded to said inner surface of said elastomer seal, said polymer cap including a first cap portion adjacent to the first asymmetric portion and a second cap portion opposite the first cap portion and adjacent to the second asymmetric portion, said polymer cap being configured to asymmetrically extrude under pressure with the first cap portion being deformed by the first asymmetric portion toward the radial wall of the seal space and the second cap portion being extruded toward the second asymmetric portion to form said fluid-tight seal against said dynamic element.

15. The actuator according to claim 14, wherein said polymer cap comprises a polytetrafluoroethylene material.

16. The actuator according to claim 14, wherein said elastomer seal includes a first seal portion connected to a second seal portion, said first seal portion defining a first seal cross-sectional shape and said second seal portion defining a second seal cross-sectional shape that is different than said first seal cross-sectional shape.

17. The actuator according to claim 16, wherein at least one of said first seal portion and said second seal portion includes at least one rounded corner.

18. The actuator according to claim 14, wherein said first cap portion defining a first cap cross-sectional shape and said second cap portion defining a second cap cross-sectional shape that is different than said first cap cross-sectional shape.

19. An actuator, comprising:
a housing having a chamber formed therein and a seal space in fluid communication with said chamber formed therein, the seal space having a radial wall;
a curved shaft disposed within said chamber, defining an arced longitudinal axis and being curved in a direction of said arced longitudinal axis, and having a first curved portion and a second curved portion; and
a sealing assembly placed in said seal space to form a continuous fluid-tight seal against said first and second curved portions of the curved shaft, said sealing assembly including:
an elastomer seal having an inner surface and an outer surface in contact with the radial wall of the seal space; and
a polymer cap bonded to said inner surface of said elastomer seal and having a dynamic sealing surface configured to form said fluid-tight seal, and said dynamic sealing surface including a sealing lip and a pair of angled edges flanking the sealing lip forming a pair of pockets on each side of the sealing lip for a lubricant to collet therein so that the sealing lip seals against the curved shaft and said lubricant filled pockets reduce friction acting on the dynamic sealing surface of the polymer cap.

* * * * *